United States Patent Office 3,476,499
Patented Nov. 4, 1969

3,476,499
SELECTIVELY LIGHT ABSORBING CONTACT LENS
Otto Wichterle, Prague, Czechoslovakia, assignor to Ceskoslovenská Akademie Věd, Prague, Czechoslovakia
No Drawing. Continuation-in-part of application Ser. No. 393,763, Sept. 1, 1964. This application Jan. 4, 1965, Ser. No. 423,325
Claims priority, application Czechoslovakia, Sept. 11, 1963, 5,042/63
Int. Cl. D06p 3/52
U.S. Cl. 8—4
2 Claims

ABSTRACT OF THE DISCLOSURE

Contact lenses consisting of sparingly cross-linked acrylic polymers in the form of a shape-retaining gel are colored or made opaque by diffusing a solution of an impregnating agent and a solution of a precipitating agent into the gel from different surfaces, the precipitating agent being adapted to form an insoluble colored or opaque precipitate with the impregnating agent. The insoluble precipitate formed remote from the lens surface does not affect the physiological acceptability of the lens.

---

This application is a continuation-in-part of my copending application Ser. No. 393,763, filed on Sept. 1, 1964, now abandoned.

This invention relates to contact lenses which selectively absorb light, that is, preferentially transmit light of selected wavelengths and/or preferentially transmit light through selected portions of the lens. The invention particularly relates to selectively light-absorbing contact lenses which mainly consist of hydrogels of sparingly cross-linked polymers of the type described in U.S. Patent No. 2,976,576.

Contact lenses colored over at least a portion of their optical cross section are often preferred because of their cosmetic effect. They are also being employed where it is desired to protect the eye from overly bright light and from light of specific wavelengths, for example, ultraviolet radiation. It has previously been proposed to admix certain organic dyes or pigments to the lens composition for this purpose, but it has been found difficult to control the distribution of the coloring agent in the necessary manner. It has also been attempted selectively to color hydrogel contact lenses by surface printing. An imprint on the exposed outer surface of the lens is unacceptable for reasons of appearance, and it is very difficult to produce an imprint on the inner or contact surface of the lens which does not unfavorably affect the smooth surface finish necessary for avoiding irritation of the cornea.

It has now been found that hydrogel-type contact lenses can be modified selectively to absorb light by precipitation of insoluble materials within the lens from one or more liquids with which the lens surface is brought into contact while the lens is in the swelled condition. The location and amount of the precipitate formed can readily be controlled by suitably adjusting the conditions of contact between the liquid or liquids and the lens surface which readily permits diffusion of the liquid.

For the convenience of the description, reference will hereinafter be made to "impregnating liquids" and "precipitating liquids,' but it will be appreciated that the terms are generally interchangable in that a precipitating liquid cannot be effective unless it is capable of impregnating a lens at least to some extent, and an impregnating liquid may cause precipitation.

In one preferred group of embodiments of this invention, an impregnating liquid and a precipitating liquid are chosen in such a manner that they form a light absorbing precipitate when being mixed. If opposite faces of a lens are simultaneously contacted with the impregnating liquid and the precipitating liquid respectively, an area of precipitation is formed first within the lens between the two faces at a distance from the same which is determined by the respective diffusion rates of the liquid. Precipitation may be stopped by washing the remaining unreacted liquids from the hydrogel with water.

The cup shaped contact lenses of the invention are preferably produced by polymerization of a suitable monomer mixture in a spherically concave mold while the mold rotates about a central radius of its surface. If an impregnating agent is incorporated in the polymerization mixture, and a suitable small amount of the precipitating liquid is applied to the gel formed by at least partial polymerization while the mold rotates, the precipitate forms in an annular area and leaves the center of the lens clear and uncolored.

The nature and concentration of the active agents in the precipitating and impregnating liquids affect the properties of the precipitate in an obvious manner, and so do factors which alter the diffusion rate of one or both liquids, such as temperature and the presence of surface active materials. Precisely reproducible results are obtained when these variables and the quality of the polymeric hydrogel are adequately controlled.

It is preferred to employ precipitates which are insoluble in water not only in the presence of the reactants, but also in an aqueous medium free of the reactants. The reactants and the conditions of reaction should be chosen in such a manner as to form relatively coarse particles of precipitate in the presence of the hydrogel.

Barium sulfate, for example, is a commonly used delustering agent for certain synthetic fibers and would appear eminently suitable for the purpose of this invention. It has been found, however, that only a very small amount of optically effective precipitate is formed in a hydrogel lens of the invention if the lens is immersed in barium chloride solution, rinsed, and immersed in dilute sulfuric acid. Most of the expected precipitate forms on the surface from which it is readily removed by wiping. The failure of barium sulfate to form optically dense precipitates is believed due to the fact that the particles of barium sulfate primarily formed within the hydrogel are of a size commensurate with that of the structural interstices of the hydrogel, and therefore do not precipitate from the gel as a separate phase. Barium sulfate is not truly insoluble in the hydrogel.

The solubility of a substance in water (solubility product) thus is not a reliable guide to the solubility of a corresponding precipitate in the hydrogen material of the contact lens. The relationship between the solubility of a reaction product and the size of the precipitate particles is believed to be a complex function of the crystal structure of the precipitate which is not readily derived from known properties by simple equations.

Whether or not a precipitate of adequate optical density is formed further depends not only on the properties desired, but also on the nature of the hydrogel which mainly constitutes the material of the lens. A substance which does not perform well in a very sparsely cross-linked gel having relatively large interstices may be more satisfactory in a hydrogel having a higher degree of cross-linking, and therefore smaller interstics more uniformly distributed. Barium sulfate, therefore, may be entirely suitable where a finely pigmented lens is desired, particularly if the hydrogel of the lens is relatively highly cross-linked.

A precipitate formed by a primary chemical reaction between an impregnating agent and a precipitating agent may further be modified by physical processes and/or by supplementary chemical reactions. A precipitate insoluble in water and in the hydrogel of the lens may thus be dissolved by a locally applied specific solvent. Peptizing may change the particle size of the precipitate and affect the hue of the coloring effect achieved. Since the hydrogels preferred for use in the contact lenses of the invention are highly resistant to hydrolysis and other deterioration in the presence of strong acids and bases, such inert reactants may be safely employed to modify a primary precipitate. Insoluble fluorides, for example, may be formed by the use of an impregnating solution of a suitable cation and a precipitating solution consisting of concentrated hydrofluoric acid.

Precipitates that form selective light barriers in the lenses of the invention may be formed by reactions other than those in which ions respectively supplied by an impregnating and a precipitating solution are simultaneously present in amounts which exceed their solubility product. Preferred precipitates of the invention consist of metal particles which are produced from an impregnating solution containing ions of metal and a precipitating solution which contains a reducing agent. Metallic silver, gold, and platinum may be precipitated from solutions of their salts within the hydrogel by means of hydrazine, reducing sugars, or formaldehyde respectively.

The precipitates which may be formed by reacting suitable impregnating and precipitating agents include light sensitive materials which may be selectively exposed to light and further processed in a conventional manner to produce desired patterns of light absorbing material. Silver halides are representative of such light sensitive materials which may further be exposed to light, developed, fixed, and further processed by conventional photographic processes to produce monochromatic or multicolored effects.

It has also been found that the hydrogels of the invention may be selectively colored by impregnating them with light-sensitive diazonium salts, selectively exposing them to light through a negative, and developing and fixing the latent picture produced by condensing the diazonium salt still present after exposure with a developing agent in a known manner to form an insoluble dye in the portions of the lens not previously exposed to light. Either contact or projection method may be employed in exposing a sensitized lens of the invention to light screened through a negative in a conventional manner.

Water may be employed as the precipitating agent if the impregnating liquid is a solution of a water-insoluble material in a non-aqueous solvent that is readily miscible with water so that the solvent may replace the water in the hydrogel structure of the lens, and may in turn be displaced by water.

The solvents must be neutral to the polymer in the gel structure, and many common solvents satisfy the requirements of inertness and water solubility. The following solvent classes are merely typical of those that may be employed as the main ingredient of an impregnating solution: the lower alcohols, particularly the alkanols including dihydric and polyhydric alcohols, the water soluble ketones, esters, acids, and bases. Because of their low cost and ready availability, I prefer to use glacial acetic acid, pyridine, picoline, diethylamine, acetone, methylethyl ketone, ethyl formate, dioxane, ethylene carbonate, bis-ethyleneglycol oxalate, ethyleneglycol methyl ether, glycerol, ethylene glycol, the water soluble polyglycol ethers, propylene glycol, methanol, ethanol, and the propanols.

The precipitates of the invention are water insoluble and are therefore physiologically inert. They cannot chemically irritate the eye, nor can they actually come in contact with it in significant amounts as they are unable of migrating in the hydrogel material. Selectively colored or opaqued contact lenses of the invention may be safely worn over extended periods of time. If so desired, the precipitates may be formed within the lens at an appreciable distance from the concave contact surface of the latter.

When any possibility of contact between the living tissue of the eye and the precipitate is excluded, the safety of a specific precipitate can be determined by chemical and physical tests alone without need for the usual physiological tests which are costly and time consuming. The infinitesimal amounts of metallic silver which dissolve by contact with water have a well known oligodynamic effect which contributes to the lasting sterility of lenses containing the metal.

The method of the invention is successfully applied to all contact lenses made from partly cross-linked polymeric organic hydrogels which are capable of swelling considerably in a liquid medium in which the impregnating and/or precipitating agents are soluble. Adequate swelling in water and aqueous organic solvents is characteristic of the polymeric hydrogels which are very sparsely cross-linked. Relatively strongly cross-linked gels may be employed if their structure provides the structural interstices necessary for penetration of swelling solvents so that the impregnating and penetrating agents may diffuse through the gel at reasonable rates and form precipitated particles of sufficient size in the expanded network of the swelled gel.

The colloidal and osmotic properties of the gel are not significantly affected by the presence of the insoluble precipitate, and the good compatibility of the gels with living tissue which is basic to their use as contact lenses is not altered by the formation of the selectively light-absorbing material.

The following examples are further illustrative of the method of the invention, but it will be understood that the invention is not limited thereto.

EXAMPLE 1

A contact lens was prepared at room temperature in a rotating mold having a spherically concave bottom by polymerization of a mixture of:

| | Percent by wt. |
|---|---|
| Ethylene glycol monomethacrylate | 60 |
| Diethylene glycol monomethacrylate | 20 |
| Water | 19 |
| Ethylene glycol bis-methacrylate | 0.3 |
| Ammonium persulfate | 0.4 |
| Potassium pyrosulfite | 0.3 |

The shape-retaining polymer was stored at room temperature for 24 hours in a 2% hydrazine solution and was then washed one minute in running distilled water. The concave side of the moist lens was gently pressed against a glass plate to attach the lens to the plate.

An aqueous precipitating solution was prepared by dissolving 4% silver nitrate in a 10% ammonia solution and adding enough phenolphthaleine to color the solution and to make it readily visible. A ring 4.5 millimeters in outer diameter and one millimeter in inner diameter was coaxially painted on the partly dried exposed surface of the contact lens. The colored solution diffused into the lens surface. After about one minute, precipitation of finely dispersed silver in the gel began in an area under the painted ring. Within a few minutes the precipitated silver formed a totally opaque black diaphragm.

The lens was then washed for several hours in running water to remove the excess of the reactants, and was stored in physiological saline solution (0.8% sodium chloride in water) to put it in osmotic equilibrium with eye tissue.

A diaphragm lens of this type is useful in patients who have lost accommodation in their eyes because of presbyopia or aphakia.

EXAMPLE 2

A contact lens prepared by polymerization as described in Example 1 was carefully placed, concave side up, on the surface of an aqueous 5% potassium ferricyanide solution so that it floated on the solution. A drop of an aqueous 5% ferrous sulfate solution was then applied to the center of the concave lens face which had been carefully dried with filter paper. After several hours, the central part of the lens was colored a deep blue shade.

The color had the known permanence of ferrous ferricyanide and was not affected by long washing with water nor by contact with physiological saline solution.

What is claimed is:

1. In a method of making a contact lens selectively light absorbing, the lens essentially consisting of a shape-retaining hydrogel of a sparingly cross-linked organic polymer, which comprises separately and simultaneously contacting opposite faces of said lens with a solution of an impregnating agent in a solvent readily soluble in water and with a solution of a precipitating agent in a solvent readily soluble in water while said hydrogel is in the swelled condition, said agents and solvents being inert to said hydrogel and said agents reacting with each other in the presence of said hydrogel to form within the lens a solid precipitate insoluble in water and in said hydrogel; and removing the unreacted agents from said lens after said insoluble precipitate has formed in said lens.

2. A method as set forth in claim 1, wherein at least one of said solvents is water.

References Cited

UNITED STATES PATENTS

| | | | |
|---|---|---|---|
| 2,524,811 | 10/1950 | Koberlein | 8—4 |
| 2,558,735 | 7/1951 | Cresswell | 8—4 X |
| 3,193,509 | 7/1965 | Hoffman et al. | 8—4 X |
| 3,235,381 | 2/1966 | Feild et al. | 96—27 |
| 2,976,576 | 3/1961 | Wichterle et al. | 351—160 X |
| 3,083,118 | 3/1963 | Bridgeford. | |
| 3,227,510 | 1/1966 | Bridgeford | 8—31 X |

GEORGE F. LESMES, Primary Examiner

R. E. MARTIN, Assistant Examiner

U.S. Cl. X.R.

96—27, 75; 350—162